(12) United States Patent
Markman et al.

(10) Patent No.: US 10,042,923 B2
(45) Date of Patent: *Aug. 7, 2018

(54) TOPIC EXTRACTION USING CLAUSE SEGMENTATION AND HIGH-FREQUENCY WORDS

(71) Applicant: LinkedIn Corporation, Mountain View, CA (US)

(72) Inventors: Vita G. Markman, San Francisco, CA (US); Yongzheng Zhang, San Jose, CA (US); Craig H. Martell, San Juan Bautista, CA (US); Lutz T. Finger, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 310 days.

This patent is subject to a terminal disclaimer.

(21) Appl. No.: 14/807,674

(22) Filed: Jul. 23, 2015

(65) Prior Publication Data
US 2016/0314191 A1    Oct. 27, 2016

Related U.S. Application Data

(60) Provisional application No. 62/152,279, filed on Apr. 24, 2015.

(51) Int. Cl.
*G06F 17/30* (2006.01)
*G06F 17/27* (2006.01)

(52) U.S. Cl.
CPC .... *G06F 17/30705* (2013.01); *G06F 17/2715* (2013.01); *G06F 17/2755* (2013.01);
(Continued)

(58) Field of Classification Search
CPC ........... G06F 17/30738; G06F 17/2785; G06F 17/30675; G06F 17/30601; G06F 17/2715;
(Continued)

(56) References Cited

U.S. PATENT DOCUMENTS 8,209,665 B2    6/2012  Rama
9,348,809 B1 * 10/2016  Markman et al. ............ 707/738
(Continued)

OTHER PUBLICATIONS

Samuel Huston et al., Efficient indexing of repeated n-grams, ACM, Feb. 2011, 127-136.*
(Continued)

*Primary Examiner* — Jean B Fleurantin
(74) *Attorney, Agent, or Firm* — Park, Vaughan, Fleming & Dowler LLP; Chia-Hsin Suen

(57) ABSTRACT

The disclosed embodiments provide a system for processing data. During operation, the system obtains a set of clauses in a first set of content items comprising unstructured data. Next, the system obtains a set of stop words comprising high-frequency words that occur in a second set of content items. The system then automatically extracts a set of topics from the set of clauses by generating a set of n-grams from the set of clauses and excluding a first n-gram in the set of n-grams from the set of topics when the first n-gram contains a word in the set of stop words in a pre-specified position of the first n-gram. Finally, the system displays the set of topics to a user to improve understanding of the first set of content items by the user without requiring the user to manually analyze the first set of content items.

20 Claims, 8 Drawing Sheets

(52) U.S. Cl.
CPC ...... *G06F 17/2775* (2013.01); *G06F 17/2785* (2013.01); *G06F 17/3069* (2013.01); *G06F 17/30601* (2013.01); *G06F 17/30675* (2013.01)

(58) Field of Classification Search
CPC ............. G06F 17/2755; G06F 17/2775; G06F 17/3069; G06F 17/30705
USPC ........................................................ 707/738
See application file for complete search history.

(56) References Cited

U.S. PATENT DOCUMENTS

| | | | |
|---|---|---|---|
| 9,460,457 | B1 | 10/2016 | Shaffer et al. |
| 2008/0082491 | A1 | 4/2008 | Scofield |
| 2008/0086457 | A1 | 4/2008 | Fei |
| 2008/0154883 | A1 | 6/2008 | Chowdhury |
| 2010/0235343 | A1 | 9/2010 | Cao |
| 2012/0185544 | A1 | 7/2012 | Chang |
| 2014/0058722 | A1 | 2/2014 | Sun |
| 2016/0314200 | A1* | 5/2016 | Zhao et al. ........................ 704/9 |
| 2016/0314195 | A1* | 10/2016 | Markman et al. ............ 707/738 |

OTHER PUBLICATIONS

U.S. Appl. No. 14/807,677, filed Jul. 23, 2015.
U.S. Appl. No. 14/807,678, filed Jul. 23, 2015.

\* cited by examiner

TOPIC EXTRACTION USING CLAUSE SEGMENTATION AND HIGH-FREQUENCY WORDS

RELATED APPLICATIONS

This application claims the benefit of U.S. Provisional Application No. 62/152,279, entitled "Topic Extraction Using Clause Segmentation and Frequently Used Words," by inventors Vita Markman, Yongzheng Zhang, Craig Martell and Lutz T. Finger, filed 24 Apr. 2015, which is incorporated herein by reference.

The subject matter of this application is related to the subject matter in a co-pending non-provisional application by inventors Yongzheng Zhang, Lutz Finger and Shaobo Liu, entitled "Topic Mining Using Natural Language Processing Techniques," having Ser. No. 14/266,633, and filing date 30 Apr. 2014.

The subject matter of this application is also related to the subject matter in a co-pending non-provisional application by the same inventors as the instant application and filed on the same day as the instant application, entitled "Attribute-Based Contexts for Sentiment-Topic Pairs," having Ser. No. 14/807,677, and filing date 23 Jul. 2015.

The subject matter of this application is also related to the subject matter in a co-pending non-provisional application by the same inventors as the instant application and filed on the same day as the instant application, entitled "Detecting and Combining Synonymous Topics," having Ser. No. 14/807,678, and filing date 23 Jul. 2015.

BACKGROUND

Field

The disclosed embodiments relate to topic mining. More specifically, the disclosed embodiments relate to techniques for performing topic extraction using clause segmentation and high-frequency words.

Related Art

Topic mining techniques may be used to discover abstract topics or themes in a collection of otherwise unstructured documents. The discovered topics or themes may be used to identify concepts or ideas expressed in the documents, group the documents by topic or theme, determine sentiments and/or attitudes associated with the documents, and/or generate summaries associated with the topics or themes. In other words, topic mining may facilitate the understanding and use of information in large sets of unstructured data without requiring manual review of the data.

Sentiment analysis may also be applied to documents to determine the overall sentiment, attitude, and/or polarity of the documents' creators. For example, individual words or sentences of a document may be analyzed to determine if the opinions expressed in the document are positive, negative, or neutral. Sentiment scores associated with the words or sentences may then be combined to label the overall sentiment of the document as positive, negative, or neutral.

Topic mining techniques typically utilize metrics and/or statistical models to group document collections into distinct topics and themes. For example, topics may be generated from a set of documents using metrics such as term frequency-inverse document frequency (tf-idf), co-occurrence, and/or mutual information. Alternatively, statistical topic models, such as probabilistic latent semantic indexing (PLSI), latent Dirichlet allocation (LDA), and/or correlated topic models (CTMs), may be used to discover topics from a document collection and assign the topics to documents in the document collection.

However, existing topic mining and sentiment analysis techniques are associated with a number of drawbacks. First, the use of metrics such as tf-idf to identify potential topics may be computationally efficient but may produce a large number of topics with significant overlap. On the other hand, the use of statistical topic models may require significant amounts of training data and/or computational overhead to extract topics from a set of documents.

Second, conventional sentiment analysis techniques may assign an overall sentiment to a document or topic in the document when the document contains multiple sentiments and/or topics. Moreover, sentiment analysis systems may rely on structured data sets such as product reviews and typically do not adapt well to new domains and/or noisy data sets such as social media.

Consequently, processing of large sets of unstructured data may be facilitated by mechanisms for improving the efficiency and/or accuracy of techniques for mining topics and/or identifying sentiments in the unstructured data.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
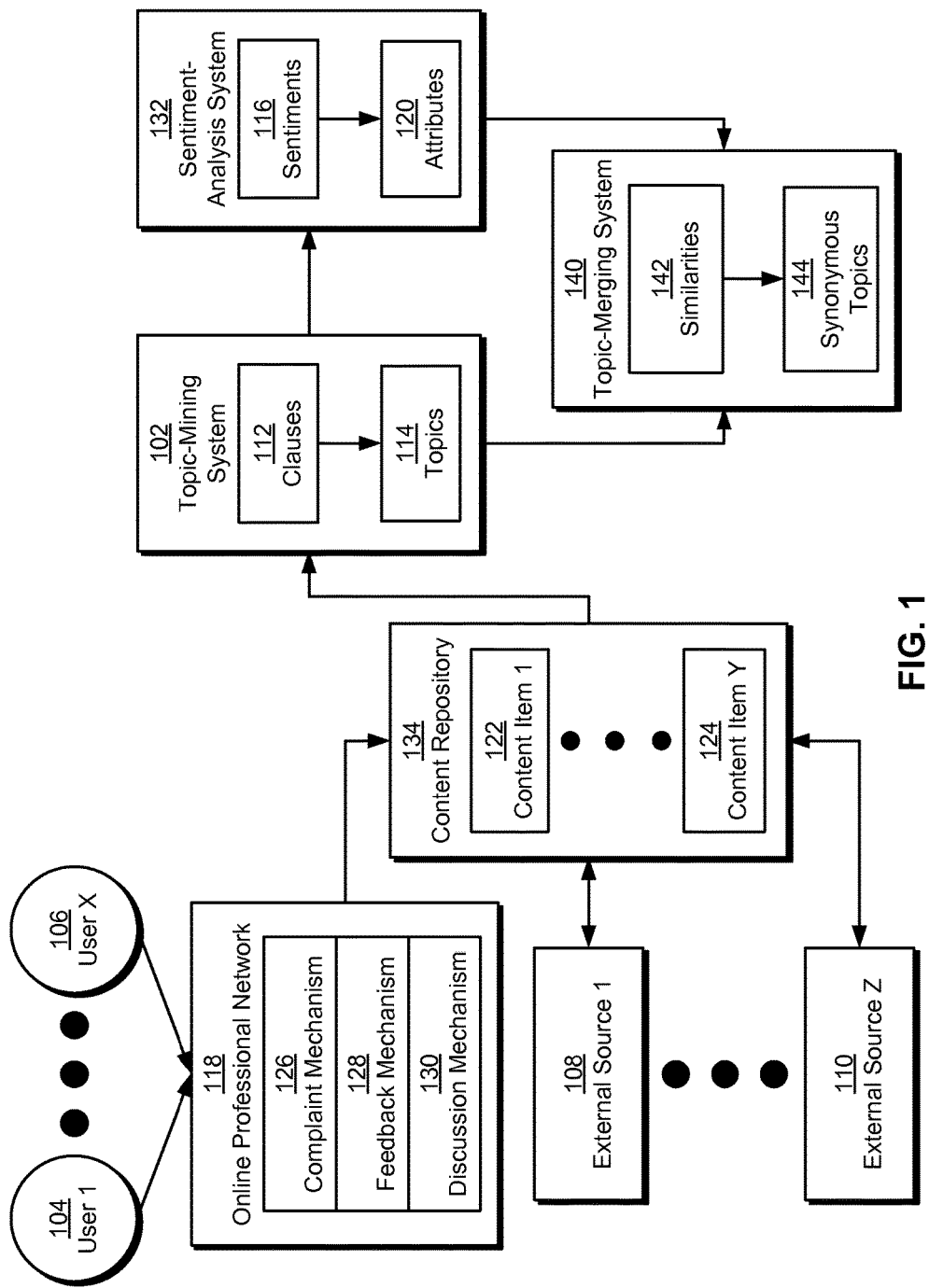
FIG. 1 shows a schematic of a system in accordance with the disclosed embodiments.

The disclosed embodiments provide a method, apparatus, and system for processing data. More specifically, the disclosed embodiments provide a method, apparatus, and system for performing topic mining of unstructured data and subsequent sentiment analysis of clauses containing the mined topics. As shown in FIG. 1, the unstructured data may be included in a set of content items (e.g., content item 1 122, content item y 124). The content items may be obtained from a set of users (e.g., user 1 104, user x 106) of an online professional network 118. Online professional network 118 may allow the users to establish and maintain professional connections, list work and community experience, endorse and/or recommend one another, and/or search and apply for jobs. Employers and recruiters may use online professional network 118 to list jobs, search for potential candidates, and/or provide business-related updates to users.

As a result, content items associated with online professional network 118 may include posts, updates, comments, sponsored content, articles, and/or other types of unstructured data transmitted or shared within online professional network 118. The content items may additionally include complaints provided through a complaint mechanism 126, feedback provided through a feedback mechanism 128, and/or group discussions provided through a discussion mechanism 130 of online professional network 118. For example, complaint mechanism 126 may allow users to file complaints or issues associated with use of online professional network 118. Similarly, feedback mechanism 128 may allow the users to provide scores representing the users' likelihood of recommending the use of online professional network 118 to other users, as well as feedback related to the scores and/or suggestions for improvement. Finally, discussion mechanism 130 may obtain updates, discussions, and/or posts related to group activity on online professional network 118 from the users.

Content items containing unstructured data related to use of online professional network 118 may also be obtained from a number of external sources (e.g., external source 1 108, external source z 110). For example, user feedback for online professional network 118 may be obtained from reviews posted to review websites, third-party surveys, other social media websites or applications, and/or external forums. Content items from both online professional network 118 and the external sources may be stored in a content repository 134 for subsequent retrieval and use. For example, each content item may be stored in a database, data warehouse, cloud storage, and/or other data-storage mechanism providing content repository 134.

In one or more embodiments, content items in content repository 134 include text input from users and/or text that is extracted from other types of data. As mentioned above, the content items may include posts, updates, comments, sponsored content, articles, and/or other text-based user opinions or feedback for a product such as online professional network 118. Alternatively, the user opinions or feedback may be provided in images, audio, video, and/or other non-text-based content items. A speech-recognition technique, optical character recognition (OCR) technique, and/or other technique for extracting text from other types of data may be used to convert such types of content items into a text-based format before the content items are stored in content repository 134.

Because content items in content repository 134 represent user opinions, issues, and/or sentiments related to online professional network 118, information in the content items may be important to improvement of user experiences with online professional network 118 and/or the resolution of user issues with online professional network 118. However, content repository 134 may contain a large amount of freeform, unstructured data, which may preclude efficient and/or effective manual review of the data by developers and/or designers of online professional network 118. For example, content repository 134 may contain millions of content items, which may be impossible to read in a timely or practical manner by a significantly smaller number of developers and/or designers.

Moreover, unstructured content items received through online professional network 118 and/or the external sources may include topics from a number of domains, and frequently lack standard semantic structures or patterns. For example, raw text from a social media post may lack a standard sentence structure and/or include abbreviations, shorthand, or misspellings in lieu of well-formed grammar and standardized word spellings. Such variations in the structure, content, and sources of content items in content repository 134 may further complicate the understanding and analysis of the content items by developers and/or designers of online professional network 118.

In one or more embodiments, the system of FIG. 1 facilitates understanding and use of information in the content items by combining topic extraction and sentiment analysis of the content items. First, a topic-mining system 102 may automatically extract a set of topics 114 from clauses 112 in the content items. As described in further detail below with respect to FIG. 2, topics 114 may be generated by separating the content items into clauses 112 based on the presence of connective words and/or punctuation marks between adjacent groups of strings in a given content item. Topics 114 may then be selected as n-grams in clauses 112 that do not include stop words and/or high-frequency words in pre-specified positions, such as at the beginning or the end of the n-grams.

Next, a sentiment-analysis system 132 may identify a set of sentiments 116 associated with topics 114 in the content items. For example, sentiment-analysis system 132 may use a statistical model to classify the sentiment of each clause that contains a given topic from topic-mining system 102. To further facilitate understanding of the opinions and/or views expressed in the content items, sentiment-analysis system 132 may extract a set of attributes 120 for each topic from words in the vicinity of the topic in clauses containing the topic, as described in further detail below with respect to FIG. 3. Attributes 120 may thus provide context for various sentiments 116 associated with topics 114.

To further simplify the understanding of topics, sentiments, and/or other information in the content items, a topic-merging system 140 may identify pairs of synonymous topics 144 in the broader set of topics 114 based on similarities 142 associated with topics 114. As discussed in further detail below with respect to FIG. 4, similarities 142 may include overlap in the sets of attributes 120 for each pair of topics and/or morphological similarities in the words included in the topics. Synonymous topics 144 may then be merged into a representative topic, and sentiments 116 and/or attributes 120 associated with synonymous topics 144 may be grouped under the representative topic.

The system of FIG. 1 may thus perform automatic extraction and/or merging of topics 114, sentiments 116, and attributes 120 related to user opinions or issues associated with online professional network 118 from a large set of content items containing unstructured data from a variety of sources. In turn, the extracted and/or merged information may be filtered, displayed, queried, and/or otherwise used by developers and/or designers of online professional network 118 to understand the user opinions or issues without manually analyzing individual content items. For example, the system of FIG. 1 may include a management component (not shown) with a user interface that displays sentiments 116 and attributes 120 under synonymous topics 114 and enables further filtering, querying, and/or processing of the displayed information by a designer or developer of online professional network 118. As a result, the management component may improve understanding of content items in content repository 134 without requiring the designer or developer to manually read and/or analyze the content items.

Figure 2:
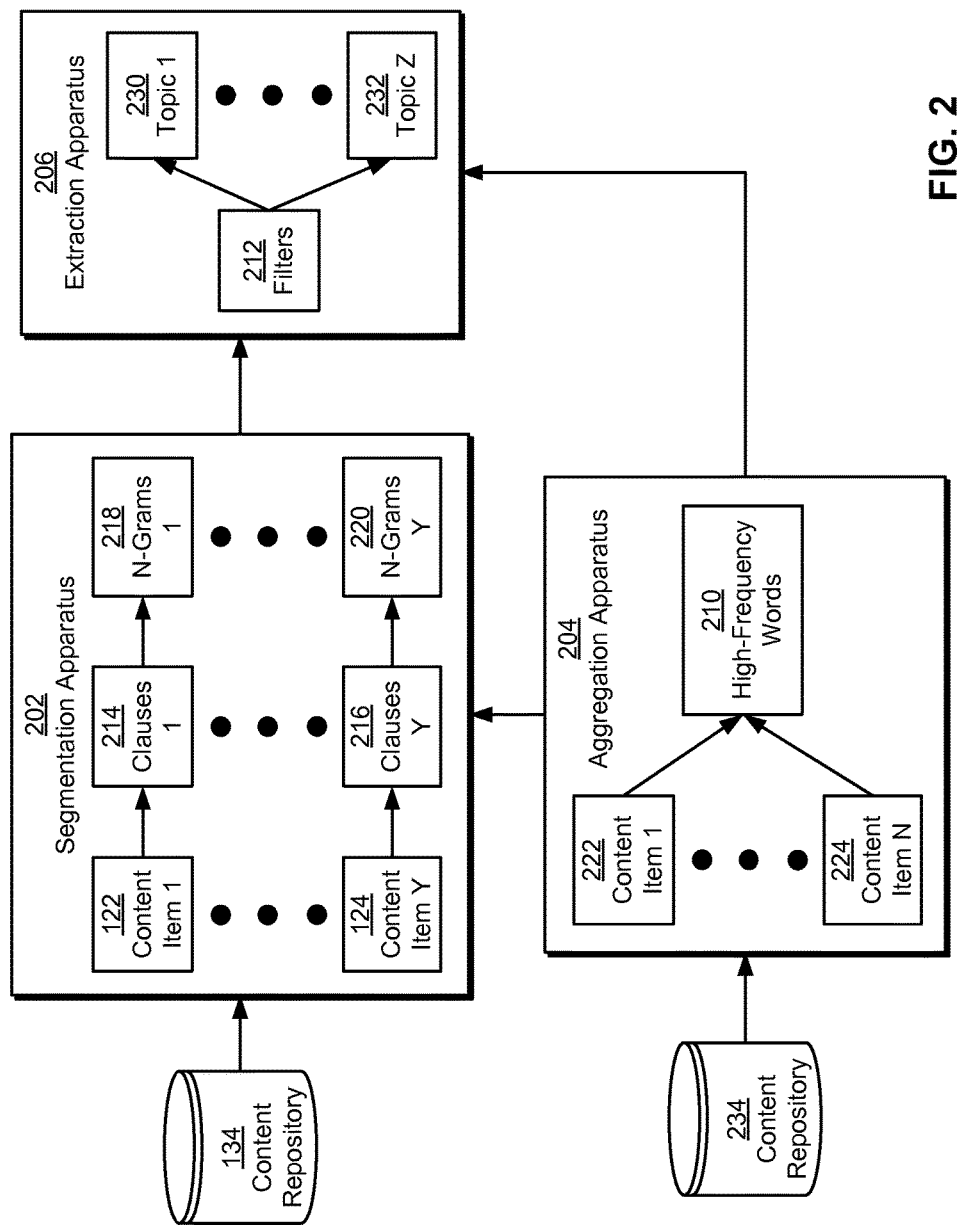
FIG. 2 shows a topic-mining system in accordance with the disclosed embodiments.

FIG. 2 shows a topic-mining system (e.g., topic-mining system 102 of FIG. 1) in accordance with the disclosed embodiments. As described above, the topic-mining system may be used to identify topics or themes in a set of content items, such as user comments or feedback associated with use of an online professional network (e.g., online professional network 118 of FIG. 1). As shown in FIG. 2, the topic-mining system includes a segmentation apparatus 202, an aggregation apparatus 204, and an extraction apparatus 206. Each of these components is described in further detail below.

Segmentation apparatus 202 may obtain a set of content items (e.g., content item 1 122, content item y 124) from content repository 134 and separate each content item into one or more clauses (e.g., clauses 1 214, clauses y 216). Each content item may include one or more complete or incomplete sentences, which are separated into clauses using connective words and/or punctuation marks in the content item.

In particular, the connective words and connective punctuation marks may mark clause boundaries within the sentences. For example, connective words in English may include, but are not limited to, coordinating conjunctions such as "and," "or," "but," "yet," "for," and/or "nor"; subordinate conjunctions such as "after," "although," "as," "because," "before," "even if," "even though," "if," "once," "since," "than," "that," "though," "unless," "until," "when," "whenever," "where," "while," and/or "why"; and correlative conjunctions such as "both . . . and," "not only . . . but," "either . . . or," and/or "neither . . . nor." The connective words may also include conjunctive adverbs such as "however," "moreover," "as a result," "consequently," and/or "nevertheless." Connective punctuation marks may include, but are not limited to, commas, periods, semicolons, question marks, and/or exclamation marks. Thus, a sentence such as "I love the ability to increase networking, but you send way too much email" may be separated into the clauses of "I love the ability to increase networking" and "you send way too much email."

Next, segmentation apparatus 202 may further separate each clause into one or more n-grams (e.g., n-grams 1 218, n-grams y 220). N-grams may be sequences of contiguous words of pre-specified length, such as bigrams of two contiguous words or trigrams of three contiguous words. For example, a clause of "Please stop sending email" may be separated into the bigrams of "please stop," "stop sending," and "sending email" and the trigrams of "please stop sending" and "stop sending email."

Independently of the operation of segmentation apparatus 202, aggregation apparatus 204 may generate a list of high-frequency words 210 using a different set of content items (e.g., content item 1 222, content item n 224) from a different content repository 234. Content items in content repository 234 may be unrelated to the domain of content items in content repository 134. For example, content repository 134 may contain user feedback and/or opinions related to use of an online professional network, while content repository 234 may contain articles, books, web log posts, and/or other content that is not related to use of the online professional network.

Aggregation apparatus 204 may separate content items in content repository 234 into words and count the number of times each word is found. Aggregation apparatus 204 may then order the words by frequency and obtain the list of high-frequency words 210 as a pre-specified number (e.g., 500-1000) of the most frequent words. Such words may include frequently occurring adjectives, nouns, and/or verbs that are not specific to the domain of content items in content repository 134. High-frequency words 210 may further be supplemented with one or more externally generated lists of stop words, such as lists of words that occur frequently and lack specific lexical definitions.

Extraction apparatus 206 may use n-grams from segmentation apparatus 202 and the list of high-frequency words 210 from aggregation apparatus 204 to generate a set of topics (e.g., topic 1 230, topic z 232) associated with the content items in content repository 134. More specifically, extraction apparatus 206 may apply one or more filters 212 using high-frequency words 210 and/or other criteria to obtain a subset of the n-grams generated by segmentation apparatus 202 as the set of topics for the content items. First, filters 212 may exclude an n-gram from the set of topics if the n-gram contains a word from the list of high-frequency words 210 in a pre-specified position, such as the beginning or end of the n-gram. For example, high-frequency words 210 such as "a," "the," "my," or "from" may be used to filter out n-grams such as "the book," "my address," or "send from" but not n-grams such as "address book" and "send email."

Second, filters 212 may exclude an n-gram from the set of topics when the n-gram contains a proportion of high-frequency words 210 that exceeds a threshold. For example, an n-gram may be removed from the set of topics if half or more of the words in the n-gram are found in the list of high-frequency words 210. Thus, an n-gram such as "good morning" may not be included in the set of topics because the word "good" is found in high-frequency words 210 and forms at least half of the n-gram.

Third, filters 212 may include one or more morphological filters that do not depend on high-frequency words 210. For example, filters 212 may remove n-grams containing adverbs that end in "ly," such as "feel strongly" or "worked slowly."

Consequently, filters 212 may be used to obtain well-formed, semantically informative topic phrases from the n-grams that are independent of the frequency of the phrases in the content items from content repository 134. For example, one or more filters 212 associated with high-frequency words 210 may be used to eliminate fragments and/or generic phrases from the topics, while other morphological filters 212 may be used to restrict the topics to certain parts of speech and/or word forms. Such filtering may enable the discovery of topics containing adjectival phrases such as "cyber stalking," which contain no high-frequency words 210 at the beginning or end and appear rarely in user comments or feedback, but may be important and/or relevant to the domain of the content items. The topics, content items, and/or clauses may then be further processed to identify sentiments associated with the topics, attributes that provide context for the sentiments, and/or synonymous topics that can be merged before presentation to users, as discussed below.

Those skilled in the art will appreciate that the topic-mining system may use other topic-mining techniques to extract topics from content items, in lieu of or in addition to the techniques described above. For example, the topic-mining system may combine filtering of n-grams from clauses in content items with topic mining that utilizes natural language processing (NLP) techniques to generate part-of-speech (POS) tags for content items, as described in a co-pending non-provisional application by inventors Yongzheng Zhang, Lutz Finger and Shaobo Liu, entitled "Topic Mining Using Natural Language Processing Techniques," having Ser. No. 14/266,633, and filing date 30 Apr. 2014, which is incorporated herein by reference. The topic-mining system may also select different topic-mining techniques for use with different types of data. For example, NLP-based topic mining may be used with content items that contain well-formed, standard POS patterns, while filtering of n-grams from clauses in content items may be used with content items that contain incomplete or nonstandard sentences, such as social media posts.

Figure 3:
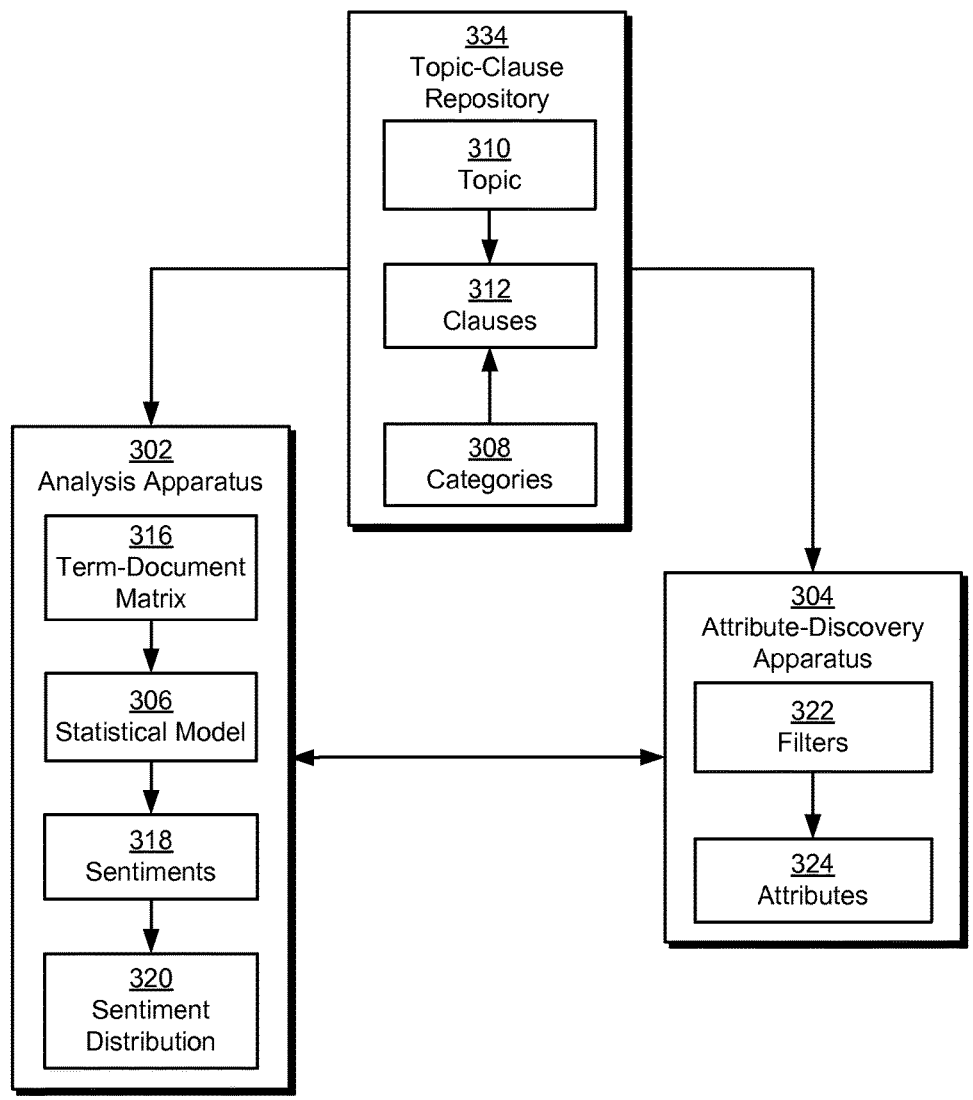
FIG. 3 shows a sentiment-analysis system in accordance with the disclosed embodiments.

FIG. 3 shows a sentiment-analysis system (e.g., sentiment-analysis system 132 of FIG. 1) in accordance with the disclosed embodiments. The sentiment-analysis system may be used to identify sentiments 318 and/or related attributes 324 for a given topic 310 from a topic-mining system, such as topic-mining system 102 of FIG. 1. The sentiment-analysis system includes an analysis apparatus 302 and an attribute-discovery apparatus 304.

First, analysis apparatus 302 may obtain topic 310 and a set of clauses 312 containing topic 310 from a topic-clause repository 334. Topic 310 and clauses 312 may be generated from a set of content items by the topic-mining system, as described above with respect to FIG. 2. For example, topic 310 and clauses 312 may be automatically extracted from user opinions and/or feedback related to use of an online professional network and/or another application or service. Because each clause is relatively short and topic 310 is a semantically coherent phrase that usually contains a verb/noun or a noun/adjective combination, the clause may be assumed to be about the topic. After topic 310 and clauses 312 are generated by the topic-mining system, the topic and clauses may be stored in topic-clause repository 334 for subsequent retrieval and use by analysis apparatus 302, attribute-discovery apparatus 304, and/or other components of the sentiment-analysis system.

As shown in FIG. 3, clauses 312 may also be associated with one or more categories 308. Categories 308 may optionally be included with content items from which clauses 312 were extracted. For example, user comments, feedback, and/or other content items may each be labeled with a keyword representing a product, service, and/or other category to which the content items are related. Categories 308 may be extracted from text in the content items and/or metadata (e.g., form fields) related to the content items, or categories 308 may be inferred from the content items using a machine-learning technique. As a result, categories 308 may be used as filters for clauses 312 containing topic. For example, a topic such as "email list" may be categorized and/or filtered by different products and/or features within a social network or an online professional network. Alternatively, labeling of content items with categories 308 may be omitted, and processing of clauses 312 associated with topic 310 may be performed for the set of content items as a whole instead of using separate categories 308.

Next, analysis apparatus 302 may populate a term-document matrix 316 with clauses 312 and provide term-document matrix 316 as input to a statistical model 306. Each clause may be included as a row in term-document matrix 316, and columns of term-document matrix 316 may specify the number of times a given word appears in the clause. Alternatively, clauses 312 may be inputted as separate vectors into statistical model 306.

Statistical model 306 may process clauses 312 and output a set of sentiments 318 for the clauses. For example, statistical model 306 may be a support vector machine (SVM) that is trained using a set of clauses and/or content items that have been manually labeled with positive, negative, or neutral sentiment. After the SVM is trained, the SVM may classify the sentiment of a given clause as positive, negative, neutral, or unknown (e.g., if the clause is in a language that was not used during training of the SVM).

After sentiments 318 for clauses 312 are obtained using statistical model 306, analysis apparatus 302 may aggregate sentiments 318 into a sentiment distribution 320 for topic 310. Sentiment distribution 320 may represent a breakdown of sentiments 318 for topic 310. For example, if 100 clauses mention the topic "address book" and statistical model 306 classifies 80 of the clauses as negative, 10 of the clauses as positive, and 10 of the clauses as neutral, the resulting sentiment distribution 320 for the topic may be represented as 0.8 negative, 0.1 positive, and 0.1 neutral.

To provide additional information and/or context for sentiments 318 and/or sentiment distribution 320 for topic 310, attribute-discovery apparatus 304 may obtain a set of attributes 324 related to topic 310. Attributes 324 may include words that are found in the vicinity of topic 310 within clauses 312. For example, a set of candidate attributes may be obtained as all words that appear in the same clauses 312 as topic 310.

Next, attribute-discovery apparatus 304 may apply one or more filters 322 to words that are included with topic 310 in clauses 312 to obtain attributes 324. First, filters 322 may include one or more lists of high-frequency words (e.g., high-frequency words 210 of FIG. 2) that are removed from a set of candidate attributes to obtain attributes 324. For example, frequent and/or uninformative words such as "thank," "you," "greatly," and/or "in" may be removed from a list of candidate attributes for topic 310.

Second, filters 322 may remove attributes that tend to repeat among a number of topics. For example, user comments or feedback related to products on social networks may include words such as "social," which do not improve contextual understanding of topics or sentiments related to the comments or feedback. As a result, a metric such as term frequency-inverse document frequency (tf-idf) may be calculated for each candidate attribute, with the tf calculated as the frequency of the candidate attribute in a given topic and the idf calculated using the frequency of the candidate attribute across topics in a given set of content items. If the value of the metric for the candidate attribute does not pass a threshold, the candidate attribute may be omitted from the set of attributes 324 for topic 310.

Those skilled in the art will appreciate that other types of filters 322 may be used to refine the contextual set of attributes 324 for topic 310. For example, one or more morphological filters may be applied so that attributes 324 adhere to certain parts of speech and/or word forms.

After filters 322 are used to produce attributes 324 from clauses 312, attributes 324 may be provided with sentiments 318 and/or sentiment distribution 320 as context for user opinions related to topic 310. For example, a topic such as "address book" may be associated with attributes such as "imports," "invasive," "invade," "stolen," "steal," "hack," or "privacy," which may provide an explanation for a largely negative sentiment distribution 320 for the topic. In another example, a topic that is inherently associated with a negative sentiment, such as "cyber stalking," may include attributes that clarify the presence of the topic in the content items, such as "anonymously," "hide," "restraining," "displayed," "creepy," or "clicked." Attributes 324 may additionally be filtered or categorized by sentiments 318 so that subsets of attributes 324 are shown for positive, negative, and neutral sentiments related to topic 310 (e.g., different "topic-sentiment" pairs).

Such categorization of attributes 324 by sentiment may allow a user to understand the reasons topic 310 is viewed positively, negatively, or neutrally by other users. Moreover, the identification of sentiment by topic 310 and/or clause may allow different topics and associated sentiments to be extracted from individual content items and/or sentences. For example, the sentiment-analysis system may process a product review of "great camera but terrible battery life" to obtain a positive sentiment for the topic "camera" and a negative sentiment for the topic "battery life" from the same product review. Consequently, the sentiment-analysis system may provide a more nuanced and/or complex overview of sentiments 318 and attributes 324 for various topics and/or content items than sentiment-analysis techniques that attempt to identify an overall sentiment for an entire content item and/or sentence.

Figure 4:
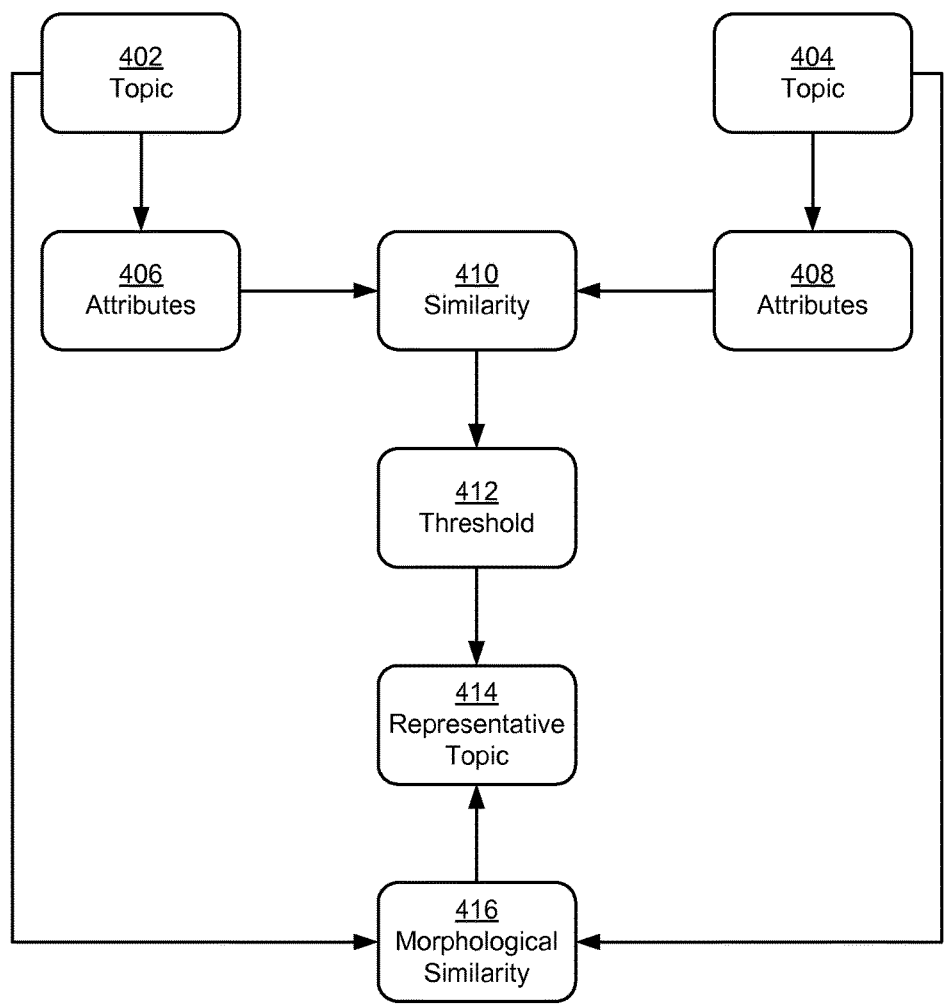
FIG. 4 shows the operation of a topic-merging system in accordance with the disclosed embodiments.

FIG. 4 shows the operation of a topic-merging system (e.g., topic-merging system 140 of FIG. 1) in accordance with the disclosed embodiments. As described above, the topic-merging system may compare pairs of topics 402, 404 and merge them into a representative topic 414 based on a similarity 410 associated with attributes 406, 408 of the topics and/or a morphological similarity 416 of the topics.

Morphological similarity 416 may be used to identify topics 402, 404 containing words with the same stem and different morphological endings. For example, morphological similarity 416 may be used to identify "browse profiles" and "browsing profiles" as the same, and "view profiles" and "viewing profiles" as the same. On the other hand, a semantic relationship between "browse profiles" or "view profiles" may not be detected using morphological similarity 416. Instead, semantically related but morphologically different topics may be detected based on the amount of overlap the attributes associated with the topics, as discussed below.

When pairs of topics 402, 404 are detected as having morphological similarity 416, known morphological endings such as "-ed" and "-ing" may be removed, and the topics may be merged into representative topic 414. For example, three topics of "viewed profiles," "view profiles," and "viewing profiles" may be merged into a single representative topic 414 of "view profiles," which lacks a specific morphological ending.

Topics 402, 404 may also be merged based on similarity 410 of attributes 406, 408 instead of morphological similarity 416. As described above, the attributes may be informative words that appear in the same clauses as topics 402, 404 and provide context for sentiments associated with the topics. In turn, pairs of topics 402, 404 that have significant overlap in attributes 406, 408 may be identified as semantically related and/or synonymous.

To determine similarity 410 in attributes 406, 408, the topic-merging system may calculate a metric such as a cosine coefficient, Jaccard coefficient, and/or Dice coefficient from the attributes. Each attribute may also be weighted by tf-idf across topics and/or another measure of relative importance. For example, similarity 410 may be calculated as a linear combination of attributes 406, 408 and their corresponding tf-idfs. The stemming and/or morphological techniques associated with merging topics 402, 404 with morphological similarity 416 may also be applied to the attributes if morphological filters weren't previously applied to the attributes during discovery of attributes by a sentiment-analysis system (e.g., sentiment-analysis system 132 of FIG. 1).

Similarity 410 may then be compared to a threshold 412. If similarity 410 exceeds threshold 412, topics 402, 404 may be identified as synonymous and merged under representative topic 414. For example, threshold 412 for a Dice coefficient calculated from attributes 406, 408 may be set to a value such as 0.7 or 0.75. If the Dice coefficient for the attributes from a given pair of topics 402, 404 exceeds threshold 412, the topics may be grouped under representative topic 414.

Consequently, similarity 410 and threshold 412 may be used to detect semantic similarities between context- and domain-dependent topics. For example, similarity 410 and threshold 412 may be used to merge topics such as "browse profiles" and "view profiles" under "view profiles" based on the overlap in attributes of the two topics. Moreover, attribute-based similarity 410 of topics 402, 404 may be used to distinguish between contexts in which words in the topics have the same meaning and contexts in which words in the topics have different meanings. Continuing with the above example, the words "browse" and "view" may be used interchangeably in the context of web pages and/or profiles but not in other contexts (e.g., movies, clothing, etc.). Because semantic similarity of the words may be established using the contexts and the domain in which the words appear, merging of topics 402, 404 based on similarity 410 may be more accurate than thesaurus matching of words in the topics, which does not account for the contexts in which the words are used.

Figure 5:
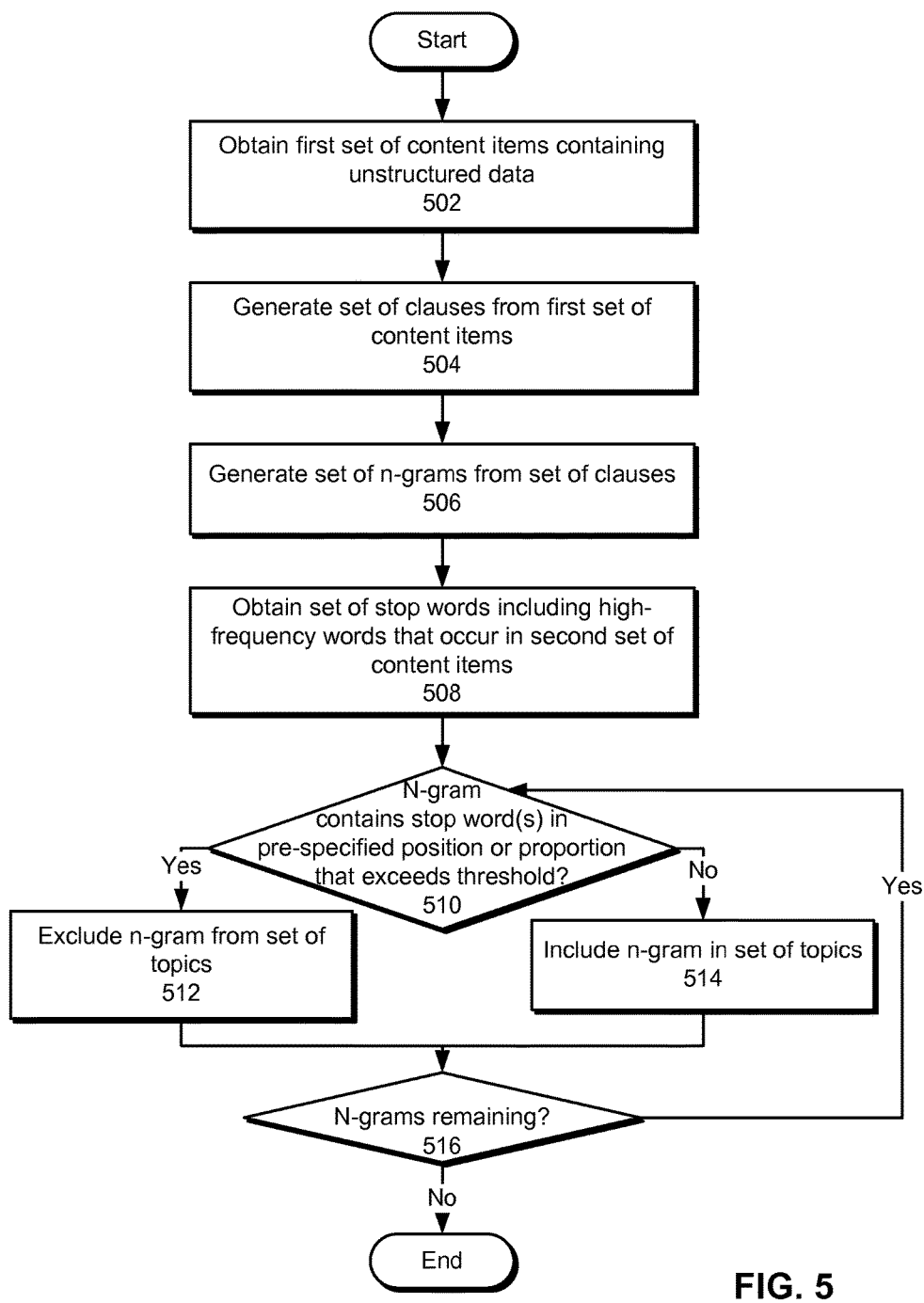
FIG. 5 shows a flowchart illustrating the processing of data in accordance with the disclosed embodiments.

FIG. 5 shows a flowchart illustrating the processing of data in accordance with the disclosed embodiments. More specifically, FIG. 5 shows a flowchart of a method of automatically extracting a set of topics from a set of content items. In one or more embodiments, one or more of the steps may be omitted, repeated, and/or performed in a different order. Accordingly, the specific arrangement of steps shown in FIG. 5 should not be construed as limiting the scope of the embodiments.

Initially, a first set of content items containing unstructured data is obtained (operation 502). In some embodiments, the content items may include customer surveys, complaints, reviews, group discussions, and/or social media content. For example, the content items may contain feedback and/or user comments related to use of an online professional network. Alternatively, the content items may contain unstructured data related to other domains and/or categories.

Next, a set of clauses is generated from the first set of content items (operation 504). The clauses may be generated by separating sequences of words in the content items based on a presence of connective words (e.g., conjunctions) and/or connective punctuation marks (e.g., commas, semicolons, periods, exclamation marks, question marks, etc.) in the clauses. For example, the sentence "I haven't been able to log in, so I can't pay my bill" may be separated into the clauses of "I haven't been able to log in" and "I can't pay my bill" based on the presence of the word "so" and/or a comma in the sentence.

A set of n-grams is then generated from the clauses (operation 506). For example, each clause may be divided into n-grams of one or more pre-specified lengths (e.g., 2, 3, etc.), with each n-gram containing a sequence of consecutive words from the corresponding clause. For example, the clause "I can't pay my bill" may be divided into bigrams of "I can't," "can't pay," "pay my," and "my bill" and trigrams of "I can't pay," "can't pay my," and "pay my bill."

A set of stop words including high-frequency words that occur in a second set of content items is obtained (operation 508). The stop words may be generated by ordering a set of words in the second set of content items by frequency and including a pre-specified number of the most frequent words from the ordering in the set of stop words. The second set of content items may be in a different domain from the first set of content items. For example, the first set of content items may include user opinions or feedback for a product, while the second set of content items may include books and/or news articles that are not related to the product. The stop words may also be created from and/or supplemented by external lists of stop words.

The n-grams and set of stop words may then be used to automatically extract a set of topics from the set of clauses. In particular, each n-gram may be examined to determine if the n-gram contains one or more stop words in one or more pre-specified positions and/or a proportion that exceeds a threshold (operation 510). For example, the n-gram may be parsed to detect the presence of a stop word in the beginning and/or end of the n-gram. A threshold of 0.5 may also be set to ensure that less than half of the words in the n-gram are stop words.

If the n-gram does not contain stop words in one or more pre-specified positions and/or a proportion of stop words in the n-gram does not exceed the threshold, the n-gram is included in a set of topics (operation 514) for the first set of content items. If the n-gram contains a stop word in a pre-specified position and/or a proportion of stop words in the n-gram exceeds the threshold, the n-gram is excluded from the set of topics (operation 512). The positions of stop words and/or threshold in operation 508 may thus be used to generate semantically coherent, informative topics from the n-grams independently of the frequency of the topics in the first set of content items.

Topics may continue to be generated from remaining n-grams (operation 516) generated from clauses in the set of content items. Each remaining n-gram is analyzed for stop words in pre-specified positions and/or a proportion of stop words that exceeds a threshold (operation 510). The n-gram is then included in the set of topics (operation 514) or excluded from the set of topics (operation 512) based on the presence or absence of stop words in the pre-specified positions and/or the crossing of the threshold by the proportion of stop words in the n-gram. The set of topics may then be displayed to a user to improve understanding of the first set of content items by the user without requiring the user to manually analyze the first set of content items. The topics may also be used in sentiment analysis of the content items and/or merged before presentation to the user, as described in further detail below with respect to FIGS. 6-7.

Figure 6:
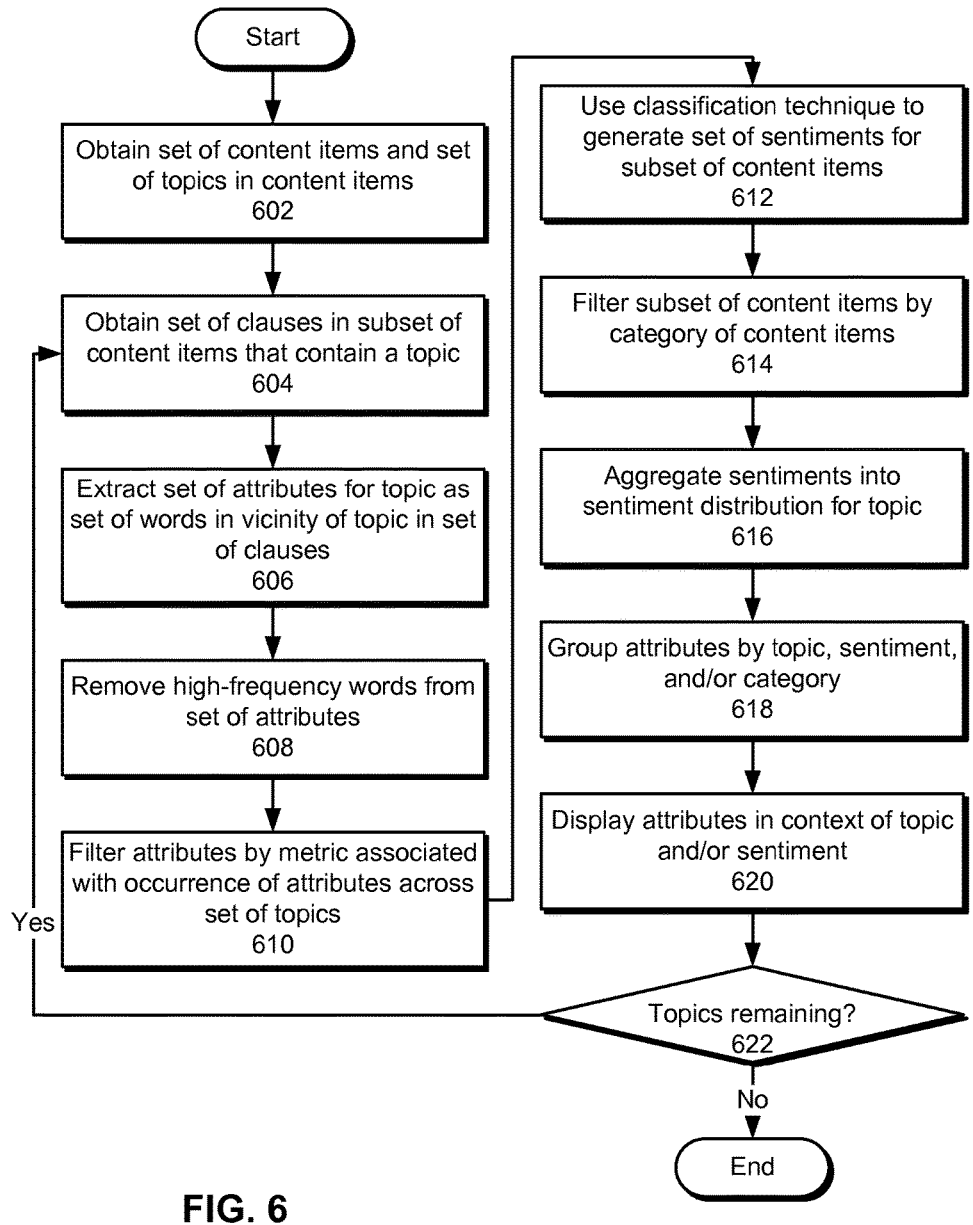
FIG. 6 shows a flowchart illustrating the processing of data in accordance with the disclosed embodiments.

FIG. 6 shows a flowchart illustrating the processing of data in accordance with the disclosed embodiments. More specifically, FIG. 6 shows the generation of sentiments and associated contexts for topics in a set of content items. In one or more embodiments, one or more of the steps may be omitted, repeated, and/or performed in a different order. Accordingly, the specific arrangement of steps shown in FIG. 6 should not be construed as limiting the scope of the embodiments.

First, a set of content items and a set of topics in the content items are obtained (operation 602). The content items may include unstructured data from one or more sources. The topics may be automatically extracted from the content items using the techniques described above.

Next, a set of attributes that provides a context for a topic is automatically extracted from a subset of the content items containing the topic. First, a set of clauses in a subset of the content items that contains a given topic is obtained (operation 604), and a set of attributes for the topic is extracted as a set of words in the vicinity of the topic in the set of clauses (operation 606). For example, clauses containing the topic may be stored with an identifier for the topic, and the set of attributes may initially be obtained as words that appear in the same clauses as the topic.

The set of attributes may then be refined by removing high-frequency words from the set of attributes (operation 608) and filtering the attributes by a metric associated with an occurrence of the attributes across the set of topics (operation 610). For example, high-frequency words that appear in a list of stop words used to generate the topic may be removed from the set of attributes because the high-frequency words are generally uninformative and/or irrelevant to the context of the topic. Similarly, a metric such as tf-idf may be used to identify words that appear frequently across topics and remove the words from the set of attributes.

One or more sentiments associated with the topic may also be obtained, independently of attributes associated with the topic. The sentiments may be generated for the subset of the content items containing the topic using a classification technique (operation 612). For example, a statistical model such as an SVM may be used to classify each clause containing the topic as having a positive, negative, neutral, or unknown sentiment. The statistical model may be trained using content items that have been manually labeled with sentiments by one or more users.

A subset of the content items may also be filtered by a category of the content items (operation 614). For example, each content item may be associated with a category such as a product or service to which the content item is related. The category may be specified in metadata with the content item or extracted, manually or automatically, from the content item. Conversely, filtering of the content items by category may be omitted if the content items are not associated with one or more categories and/or the sentiments and contexts for the topics in the content items are to be generated for the set of content item as a whole.

Once the sentiments are generated, the sentiments are aggregated into a sentiment distribution for the topic (operation 616). For example, the sentiments may be aggregated into percentages and/or proportions of positive, negative, neutral, and/or unknown sentiments for the topic.

The attributes identified in operations 604-610 may then be grouped by topic, sentiment, and/or category (operation 618) and displayed in the context of the topic and/or sentiment (operation 620). For example, the attributes may be displayed with the topic to one or more users to improve understanding of user opinions associated with the topic in the content items without requiring manual analysis of the content items. The attributes may also be organized by sentiment to facilitate identification of various causes of positive, negative, and/or neutral sentiments associated with the topic. The sentiments and/or attributes may further be organized or filtered by category to enable identification of specific sentiments and/or attributes for a given category and/or comparison of sentiments and/or attributes across categories. For example, different topics, sentiment distributions and attributes may be presented for different products or services to improve understanding of positive, negative, and neutral user opinions of the products or services.

Attributes and sentiments may continue to be generated for remaining topics (operation 622) in the set of content items. For example, attributes and sentiments may be identified for all topics that were extracted from the content items using the techniques described above. For each remaining topic, a set of attributes may be generated from a set of clauses containing the topic (operations 604-610), along with a set of sentiments and a sentiment distribution for the topic (operations 612-626). The attributes may then be grouped, filtered, and/or displayed in association with the topic, the sentiments, and/or a category associated with the content items (operations 618-620). For example, subsets of the attributes may be displayed for each sentiment-topic pair found in the set of content items.

Figure 7:
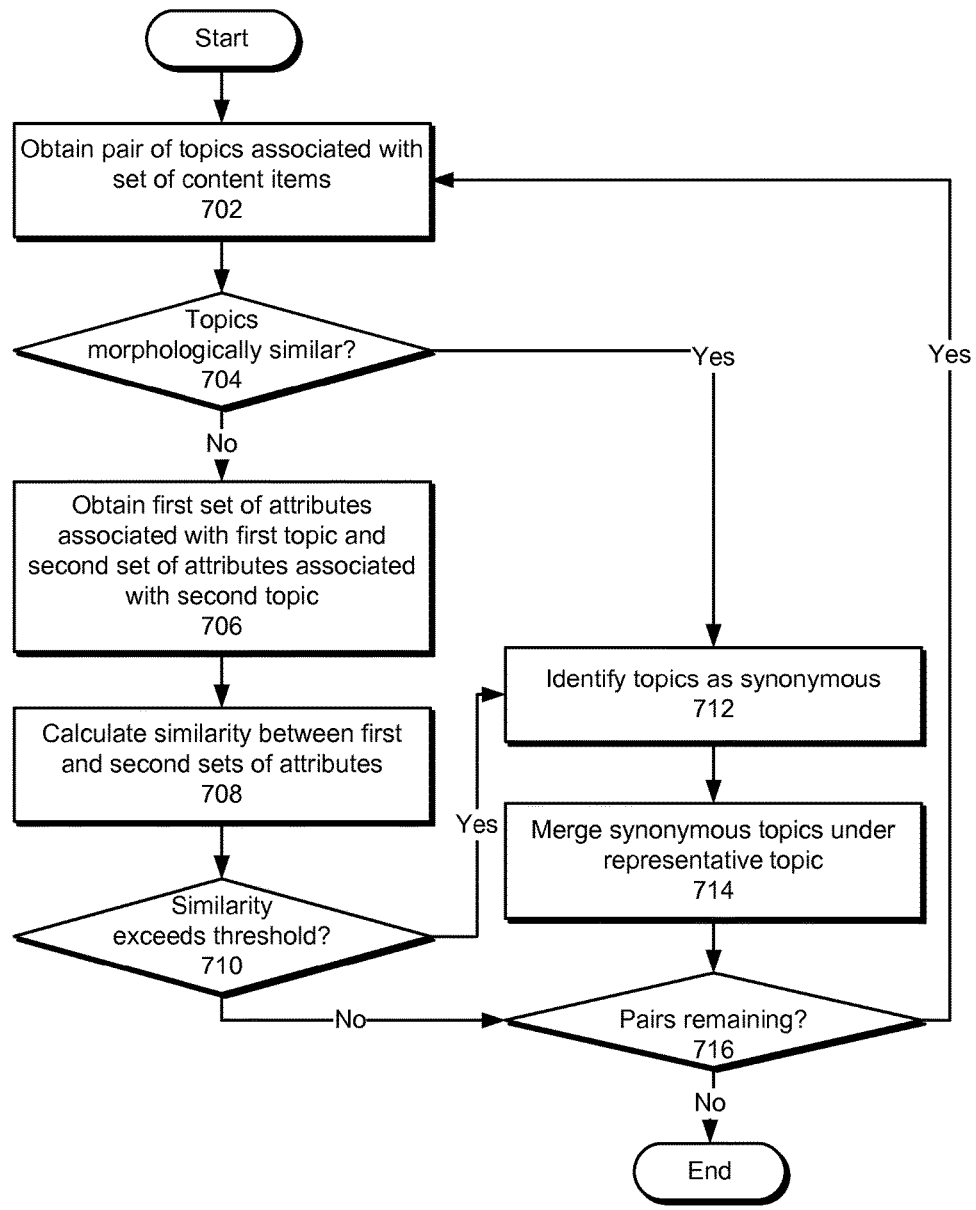
FIG. 7 shows a flowchart illustrating the processing of data in accordance with the disclosed embodiments.

FIG. 7 shows a flowchart illustrating the processing of data in accordance with the disclosed embodiments. More specifically, FIG. 7 shows the identification and merging of synonymous topics in a set of content items. In one or more embodiments, one or more of the steps may be omitted, repeated, and/or performed in a different order. Accordingly, the specific arrangement of steps shown in FIG. 7 should not be construed as limiting the scope of the embodiments.

First, a pair of topics associated with a set of content items is obtained (operation 702). For example, both topics may be found in user opinions or feedback related to use of an online professional network and/or other product or service. The topics may be automatically extracted from the content items, as described above.

The topics may be examined for a morphological similarity (operation 704). For example, the morphological similarity may be detected when words in the topics are identical or share the same stem and different morphological endings. If the topics are morphologically similar, the topics are identified as synonymous (operation 712), and the synonymous topics are merged under a representative topic (operation 714). For example, the morphologically similar topics of "view profiles," "viewed profiles," and "viewing profiles" may be merged into a representative topic that contains the common stem and lacks a specific morphological ending, such as "view profiles."

If the topics do not share a morphological similarity, the topics may be merged based on semantic similarity. To establish the semantic similarity, a first set of attributes associated with the first topic in the pair and a second set of attributes associated with the second topic in the pair are obtained (operation 706). As discussed above, each set of attributes may include words that are found in clauses containing the respective topic. Because the attributes provide a context for user opinions or sentiments regarding the topic, the amount of overlap in the attributes in the pair of topics may reflect the semantic similarity of the topics.

Next, a similarity between the first and second sets of attributes is calculated (operation 708). For example, the similarity may be calculated as a cosine similarity, Jaccard similarity, Dice coefficient, and/or other type of vector similarity. During the calculation of the similarity, the first and second sets of attributes may be weighted by tf-idf and/or another measure of relative importance so that similarities in attributes that do not occur widely across topics are emphasized over similarities in attributes that are found in many topics.

The calculated similarity may exceed a threshold (operation 710). For example, the similarity may be compared to a numeric threshold to determine if the topics can be considered synonymous or not. If the similarity exceeds the threshold, the topics are identified as synonymous (operation 712) and merged under a representative topic (operation 714). For example, the topics of "browse profiles" and "view profiles" may be merged under "view profiles," along with morphological variations (e.g., "browsing profiles, "browsed profiles," "viewed profiles," "viewing profiles," etc.) of both topics that were previously merged using operations 704 and 712-714.

Identification and merging of synonymous topics may be performed for remaining pairs (operation 716) of topics in the content items. If pairs of topics remain, each pair is obtained (operation 702) and examined for a morphological similarity (operation 704). If the morphological similarity is found, the topics are identified as synonymous and merged (operations 712-714). If no morphological similarity is found, a semantic similarity in the topics is examined using attributes associated with each topic (operations 706-710), and the topics are merged if the semantic similarity is found (operations 712-714).

After all pairs of topics have been analyzed for similarities and/or merged, the topics may be displayed to a user to improve understanding of the set of content items by the user without requiring the user to manually analyze the set of content items. For example, attributes and/or sentiments associated with two synonymous topics may be presented under the representative topic into which the topics were merged. Such aggregation of the attributes and/or sentiments under the representative topic may reduce the amount and/or complexity of information presented to the user, thereby improve understanding of the information by the user.

Figure 8:
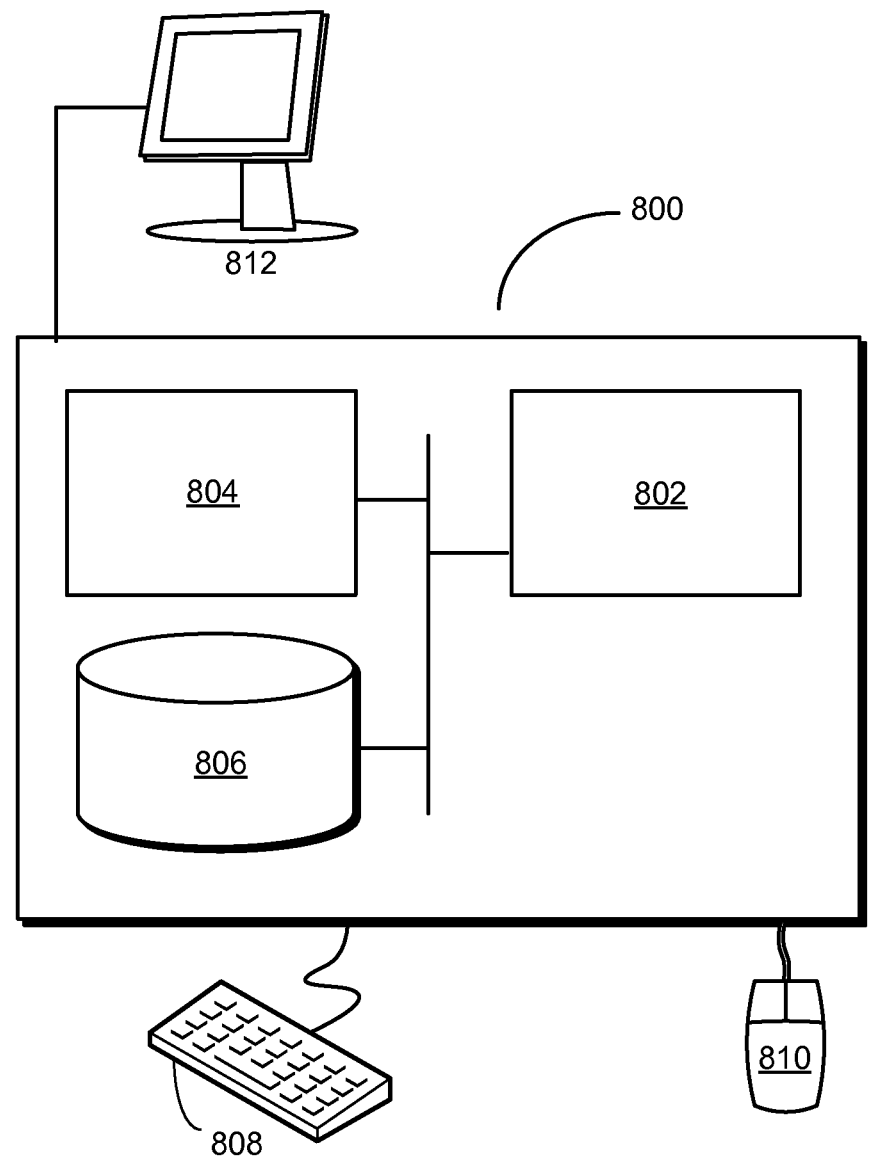
FIG. 8 shows a computer system in accordance with the disclosed embodiments.

FIG. 8 shows a computer system 800 in accordance with an embodiment. Computer system 800 may correspond to an apparatus that includes a processor 802, memory 804, storage 806, and/or other components found in electronic computing devices. Processor 802 may support parallel processing and/or multi-threaded operation with other processors in computer system 800. Computer system 800 may also include input/output (I/O) devices such as a keyboard 808, a mouse 810, and a display 812.

Computer system 800 may include functionality to execute various components of the present embodiments. In particular, computer system 800 may include an operating system (not shown) that coordinates the use of hardware and software resources on computer system 800, as well as one or more applications that perform specialized tasks for the user. To perform tasks for the user, applications may obtain the use of hardware resources on computer system 800 from the operating system, as well as interact with the user through a hardware and/or software framework provided by the operating system.

In one or more embodiments, computer system 800 provides a system for processing data. The system may include a topic-mining system that obtains a set of clauses in a first set of content items containing unstructured data and a set of stop words containing high-frequency words that occur in a second set of content items. Next, the topic-mining system may automatically extract a set of topics from the set of clauses by generating a set of n-grams (e.g., bigrams, trigrams, etc.) from the set of clauses and excluding a first n-gram in the set of n-grams from the set of topics when the first n-gram contains a word in the set of stop words in a pre-specified position of the first n-gram.

The system may also include a sentiment-analysis system. The sentiment-analysis system may obtain a set of content items and a set of topics in the set of content items. Next, the sentiment-analysis system may automatically extract a set of attributes that provides a context for each topic in the set of topics from a subset of the content items containing the topic. The sentiment-analysis system may also obtain one or more sentiments associated with the topic and group the attributes by the sentiment(s).

The system may further include a topic-merging system. The topic-merging system may obtain a set of topics associated with a set of content items. Next, the topic-merging system may automatically identify a set of synonymous topics within the set of topics by obtaining a first set of attributes associated with a first topic in the set of topics and a second set of attributes associated with a second topic in the set of topics, calculating a similarity between the first and second sets of attributes, and applying a threshold to the similarity to identify the first and second topics as synonymous when the similarity exceeds a threshold. The topic-merging system may then merge the first and second topics under a representative topic.

Finally, the system may include a management apparatus. The management apparatus may display the topics, attributes, and/or sentiments to a user to improve understanding of the first set of content items by the user without requiring the user to manually analyze the first set of content items. If two or more topics have been merged under a representative topic, the management apparatus may also display the representative topic in lieu of the individual, merged topics.

In addition, one or more components of computer system 800 may be remotely located and connected to the other components over a network. Portions of the present embodiments (e.g., topic-mining system, sentiment-analysis system, topic-merging system, management apparatus, etc.) may also be located on different nodes of a distributed system that implements the embodiments. For example, the present embodiments may be implemented using a cloud computing system that extracts and aggregates topics, sentiments, and attributes from content items obtained from a set of remote users.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
   obtaining a set of clauses in a first set of content items comprising unstructured data;
   obtaining a set of stop words comprising high-frequency words that occur in a second set of content items;
   automatically extracting, by one or more computer systems, a set of topics from the set of clauses by:
   generating a set of n-grams from the set of clauses;
   excluding a first n-gram from the set of n-grams when the first n-gram contains a word in the set of stop words in a pre-specified position of the first n-gram; and
   applying a morphological filter to the set of n-grams to yield a subset of the set of n-grams, wherein:
   the set of topics comprises the subset of the set of n-grams; and
   the morphological filter is independent of words in the set of stop words; and
   displaying, by the one or more computer systems, the set of topics to a user to improve understanding of the first set of content items by the user without requiring the user to manually analyze the first set of content items;
   wherein extracting the set of topics from the set of clauses further comprises:
   excluding a second n-gram from the set of n-grams when the second n-gram contains a proportion of words in the set of stop words that exceeds a threshold.

2. The method of claim 1, wherein obtaining the set of stop words comprising high-frequency words that occur in the second set of content items comprises:
   ordering a set of words in the second set of content items by frequency; and
   including a pre-specified number of most frequent words from the ordered set of words in the set of stop words.

3. The method of claim 1, further comprising:
   generating the set of clauses from the first set of content items by separating a content item into two or more clauses based on a presence of a connective word between the two or more clauses.

4. The method of claim 1, further comprising:
   generating the set of clauses from the first set of content items by separating a content item into two or more clauses based on a presence of a connective punctuation mark between the two or more clauses.

5. The method of claim 1, further comprising:
   identifying a set of synonymous topics within the set of topics; and
   merging the synonymous topics under a representative topic.

6. The method of claim 5, wherein identifying the set of synonymous topics within the set of topics comprises:
   obtaining a first set of attributes associated with a first topic in the set of topics and a second set of attributes associated with a second topic in the set of topics;
   determining a similarity between the first and second set of attributes; and
   identifying the first and second topics as synonymous when the similarity exceeds a threshold.

7. The method of claim 1, wherein the first set of content items is associated with use of one or more products in an online professional network.

8. The method of claim 1, wherein the pre-specified position of the n-gram is at least one of:
   a beginning of the n-gram; and
   an end of the n-gram.

9. The method of claim 1, further comprising, for each of one or more topics in the set of topics:

automatically extract, from the set of clauses, a set of attributes that provides a context for the topic, wherein the set of attributes comprises a set of words in a vicinity of the topic.

10. The method of claim 9, further comprising, for each of the one or more topics:
obtain a refined set of attributes by removing from the set of attributes one or more high-frequency words that appear in the set of n-grams; and
use the refined set of attributes to obtain a set of sentiments associated with the topic.

11. An apparatus, comprising:
one or more processors; and
memory storing instructions that, when executed by the one or more processors, cause the apparatus to:
obtain a set of clauses in a first set of content items comprising unstructured data;
obtain a set of stop words comprising high-frequency words that occur in a second set of content items;
automatically extract a set of topics from the set of clauses by:
generating a set of n-grams from the set of clauses;
excluding a first n-gram from the set of n-grams when the first n-gram contains a word in the set of stop words in a pre-specified position of the first n-gram; and
applying a morphological filter to the set of n-grams to yield a subset of the set of n-grams, wherein:
the set of topics comprises the subset of the set of n-grams; and
the morphological filter is independent of words in the set of stop words; and
display the set of topics to a user to improve understanding of the first set of content items by the user without requiring the user to manually analyze the first set of content items;
wherein extracting the set of topics from the set of clauses further comprises:
excluding a second n-gram from the set of n-grams when the second n-gram contains a proportion of words in the set of stop words that exceeds a threshold.

12. The apparatus of claim 11, wherein the memory further stores instructions that, when executed by the one or more processors, cause the apparatus to:
generate the set of clauses from the first set of content items by separating a content item into two or more clauses based on a presence of a connective punctuation mark between the two or more clauses.

13. The apparatus of claim 11, wherein the memory further stores instructions that, when executed by the one or more processors, cause the apparatus to:
generate the set of clauses from the first set of content items by separating a content item into two or more clauses based on a presence of a connective word between the two or more clauses.

14. The apparatus of claim 11, wherein obtaining the set of stop words comprising high-frequency words that occur in the second set of content items comprises:
ordering a set of words in the second set of content items by frequency; and
including a pre-specified number of most frequent words from the ordered set of words in the set of stop words.

15. The apparatus of claim 11, wherein the memory further stores instructions that, when executed by the one or more processors, cause the apparatus to:
for each topic in the set of topics, automatically extract a set of attributes that provides a context for the topic from a subset of the content items containing the topic.

16. The apparatus of claim 15, wherein the memory further stores instructions that, when executed by the one or more processors, cause the apparatus to:
obtain one or more sentiments associated with the topic; and
group the set of attributes by the one or more sentiments.

17. A system, comprising:
a topic-mining non-transitory computer-readable medium comprising instructions that, when executed by one or more processors, cause the system to:
obtain a set of clauses in a first set of content items comprising unstructured data;
obtain a set of stop words comprising high-frequency words that occur in a second set of content items; and
automatically extract a set of topics from the set of clauses by:
generating a set of n-grams from the set of clauses;
excluding a first n-gram from the set of n-grams when the first n-gram contains a word in the set of stop words in a pre-specified position of the first n-gram; and
applying a morphological filter to the set of n-grams to yield a subset of the set of n-grams, wherein:
the set of topics comprises the subset of the set of n-grams; and
the morphological filter is independent of words in the set of stop words;
wherein extracting the set of topics from the set of clauses further comprises:
excluding a second n-gram from the set of n-grams when the second n-gram contains a proportion of words in the set of stop words that exceeds a threshold; and
a management non-transitory computer-readable medium comprising instructions that, when executed by one or more processors, cause the system to display the set of topics to a user to improve understanding of the first set of content items by the user without requiring the user to manually analyze the first set of content items.

18. The system of claim 17, wherein obtaining the set of stop words comprising high-frequency words that occur in the second set of content items comprises:
ordering a set of words in the second set of content items by frequency; and
including a pre-specified number of most frequent words from the ordered set of words in the set of stop words.

19. The system of claim 17, wherein the topic-mining non-transitory computer-readable medium further comprises instructions that, when executed by one or more processors, cause the system to, for each of one or more topics in the set of topics:
automatically extract, from the set of clauses, a set of attributes that provides a context for the topic, wherein the set of attributes comprises a set of words in a vicinity of the topic.

20. The system of claim 19, wherein the topic-mining non-transitory computer-readable medium further comprises instructions that, when executed by one or more processors, cause the system to, for each of the one or more topics:
obtain a refined set of attributes by removing from the set of attributes one or more high-frequency words that appear in the set of n-grams; and use the refined set of attributes to obtain a set of sentiments associated with the topic.

\* \* \* \* \*